US 6,634,696 B1

United States Patent
Tiesler

(10) Patent No.: US 6,634,696 B1
(45) Date of Patent: Oct. 21, 2003

(54) SNAP FRAME VISOR

(75) Inventor: John Tiesler, Harrison Twp., MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,325

(22) Filed: Jan. 9, 2003

(51) Int. Cl.⁷ ................................................. B60J 3/00
(52) U.S. Cl. ................................ 296/97.1; 296/97.5
(58) Field of Search .......................... 296/97.1, 97.5, 296/97.9, 97.12, 97.8, 97.13, 97.2; 362/135, 492, 144, 141

(56) References Cited

U.S. PATENT DOCUMENTS

| 3,827,748 | A | * | 8/1974 | Herr et al. ................. 296/97.1 |
| 4,275,916 | A | * | 6/1981 | Skogler ..................... 296/97.5 |
| 4,384,740 | A | * | 5/1983 | Marrotta .................... 296/97.1 |
| 4,576,409 | A | * | 3/1986 | Ebert ........................ 296/97.1 |
| 4,668,005 | A | | 5/1987 | Dietz ........................ 296/97 H |
| 4,763,946 | A | * | 8/1988 | Robbins et al. ............. 296/97.1 |
| 4,867,500 | A | | 9/1989 | Oosterbaan et al. ......... 296/97.1 |
| 4,890,875 | A | | 1/1990 | Takahashi ................... 296/97.2 |
| 4,988,140 | A | * | 1/1991 | Van Order ................... 296/97.5 |
| 4,998,765 | A | * | 3/1991 | Van Order et al. .......... 296/97.1 |
| 4,998,767 | A | * | 3/1991 | Lawassani et al. .......... 296/97.1 |
| 5,007,532 | A | * | 4/1991 | Binish ....................... 296/97.1 |
| 5,031,950 | A | | 7/1991 | Miller ....................... 296/97.1 |
| 5,056,852 | A | | 10/1991 | Miller ....................... 296/97.1 |
| 5,066,061 | A | | 11/1991 | Miller ....................... 296/97.1 |
| 5,131,711 | A | * | 7/1992 | Laferle ...................... 296/97.1 |
| 5,205,639 | A | * | 4/1993 | White et al. ................ 296/97.2 |
| 5,338,082 | A | * | 8/1994 | Miller ....................... 296/97.1 |
| 5,466,405 | A | * | 11/1995 | Viertel et al. .............. 264/45.4 |
| 5,556,154 | A | * | 9/1996 | Vaxelaire ................... 296/97.1 |
| 5,580,118 | A | * | 12/1996 | Crotty, III ................. 296/97.1 |
| 5,695,237 | A | * | 12/1997 | Erickson et al. ............ 296/97.1 |
| 5,860,690 | A | * | 1/1999 | Dellinger et al. ........... 296/97.1 |
| 5,887,933 | A | * | 3/1999 | Peterson .................... 296/97.1 |
| 6,033,005 | A | * | 3/2000 | Crotty, III ................. 296/97.1 |
| 6,254,168 | B1 | * | 7/2001 | Crotty, III ................. 296/97.1 |
| 6,409,245 | B1 | * | 6/2002 | Crotty et al. ............... 296/97.1 |
| 6,527,328 | B2 | * | 3/2003 | Crotty et al. ............... 296/97.1 |
| 6,557,920 | B1 | * | 5/2003 | Hobson et al. .............. 296/97.1 |
| 6,578,895 | B1 | * | 6/2003 | Tom ........................... 296/97.1 |

FOREIGN PATENT DOCUMENTS

| DE | 41 23 117 | * | 1/1993 |
| JP | 11 334361 | * | 12/1999 |
| JP | 2001 277847 | * | 10/2001 |

* cited by examiner

Primary Examiner—Kiran Patel
(74) Attorney, Agent, or Firm—Bill C. Panagos

(57) ABSTRACT

A thin edge radius sun visor comprising a frame assembly consisting of a pair of mating frame members connected by a pair of hinges and having attached thereto a cover assembly consisting of a stiffener board and a cover fabric is disclosed. The sun visor frame assembly locked together by male/female snap locks.

20 Claims, 4 Drawing Sheets

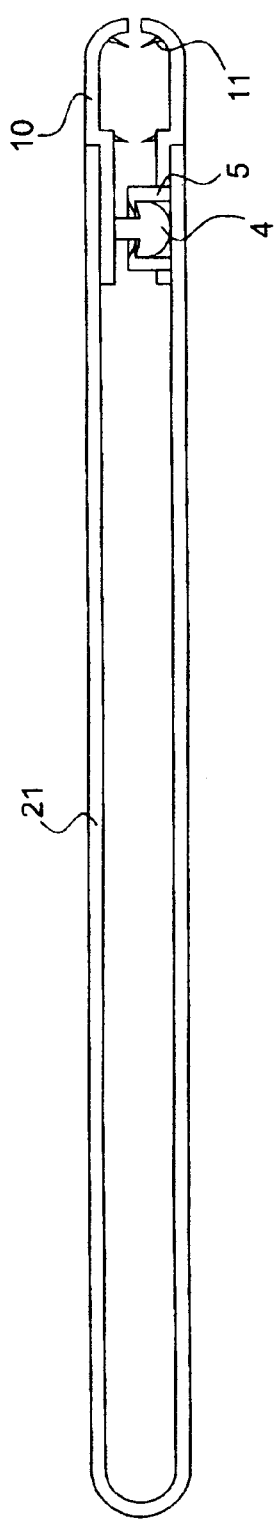
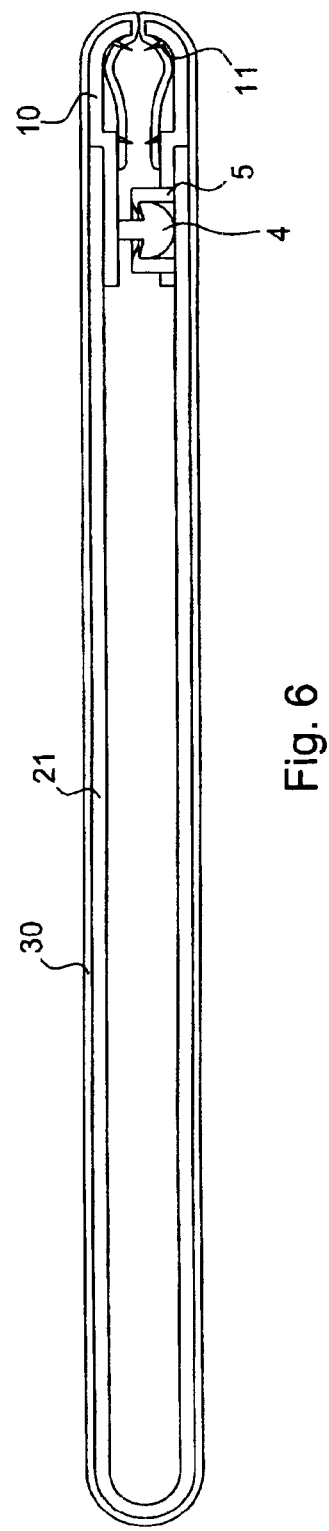

SNAP FRAME VISOR

BACKGROUND OF INVENTION

1. Field of the Invention

This invention relates to sun visors, and in particular to sun visors having an inner shell comprising a hinged snap locking frame member and a cover board member attached to said snap locking frame member.

2. Description of the Related Art

A sun visor usually has a generally rectangular shape and flat contour. It includes a relatively stiff inner reinforcing insert or frame which is connected by appropriate hinges to the vehicle. The frame is covered by fabric outer layer which is attached to the frame by appropriate means. The finished sun visor is usually of one piece, seamless and closed all around, except for an area used to allow attachment to the vehicle.

Many visors employed in automobiles are made of a plastic, shell-type core covered by a fabric colored and textured to match the interior upholstery of the vehicle. However, shell-type cores of a single material with or without an integral hinge do not allow for minimum radius edge requirements of a paper clam shell type sun visor while at the simultaneously maintaining necessary form integrity.

Because the covering fabrics of some plastic shell-type sun visors tend to pull out and loosen or "bag" during or after shell closure, pre-edge folding and gluing, mechanical fabric locking means, as well as other methods of pre-attaching the fabric to the sun visor shell have been used.

For example, U.S. Pat. No. 5,031,950 issued Jul. 16, 1991 to Miller, teaches a plastic one piece inner shell-type sun visor wherein the fabric is wrapped around the free edges of the inner shell and held in place around the peripheral boundary of the visor by means of a tongue and groove-type mating system.

U.S. Pat. No. 5,056,852 issued Oct. 15, 1991 to Miller, teaches the plastic one piece inner shell-type sun visor of U.S. Pat. No. 5,031,950 with the addition of an internal tensioning device to assist in properly holding the outer fabric around a hole in the sun visor used to hold a pin that allows the visor to attach to the vehicle for support.

U.S. Pat. No. 5,066,061 issued Nov. 19, 1991 to Miller, teaches the plastic one piece inner shell-type sun visor of U.S. Pat. No. 5,031,950 with the addition of fabric locking members to hold and position the outer fabric prior to closing the inner shell halves.

U.S. Pat. No. 3,827,748 issued Aug. 6, 1974 to Herr et al, teaches a reinforced visor utilizing two molded halves having a means for accepting a wire reinforcing insert between them. The patent also teaches a method of preventing lateral shifting of the visor halves using a series of projections and corresponding mating depressions.

U.S. Pat. No. 4,890,875 issued Jan. 2, 1990 to Takahashi, teaches a sun visor external frame member formed by mating upper and lower frame members which are aligned by pegs and mating through corresponding engagement holes. The upper and lower frame members are glued into a single unit after insertion of a transparent sheet member.

U.S. Pat. No. 4,668,005 issued May 26, 1987 to Dietz, teaches a sun visor having a solid body unit with provision for incorporating a wire reinforcing member therein.

U.S. Pat. No. 4,867,500 issued Sep. 19, 1989 to Oosterbaan et al, teaches a vehicle accessory including a body form comprising a core having two halves joined along a common edge and which are folded and snap-fitted together. The core is covered by an upholstery material captivity held by a channel in the core which includes inner and outer walls having a floor with an opening for receiving tabs of the upholstery material.

U.S. Pat. No. 5,374,097 issued Dec. 20, 1994 to George et al, teaches a universal visor mounting system which may be used with sun visor assemblies constructed of mating inner core pieces covered with fabric.

U.S. Pat. No. 6,099,066 issued Aug. 8, 2000 to Corn, teaches sun visor attached to a-vehicle utilizing a track assembly to allow for positioning of said visor either in front of the windshield or in front of the side door window. At least a portion of the sun visor utilizes a clam-shell like core portion.

DISCLOSURE OF THE INVENTION

The present invention provides advantages and alternatives over the prior art by providing a paper clam shell construction sun visor having a very thin edge radius.

According to another aspect of the present invention provides for a sun visor for motor vehicles or the like, comprising: a frame assembly comprising first and second mating frame members; each said first and second frame member having an open side; said first and second mating frame members connected at their open side ends by hinge means; said first and second mating frame members further comprising an inner recessed flange and an outer flange; said first frame member having a plurality of male frame locking means spaced along said inner recessed flange, said second frame member having a plurality of female frame locking means spaced along said inner recessed flange and positioned to mate with the corresponding plurality of male frame locking means of said first frame member, said first and said second frame members having a longitudinal channel in said outer flange and having a plurality of cloth covering locking teeth located therein; a cover assembly comprising; a liner board dimensioned to fit into the recessed inner flange area of said first and second frame members using an attaching means, and a cover fabric dimensioned to cover the frame members and liner board and wrap around the edges of said first and second locked frames and attached to said first and second frames by said plurality of cloth covering locking teeth; and said sun visor having a passage along the hinged edge of said sun visor for the installation of a mounting shaft allowing said sun visor to be mounted in a motor vehicle.

According to a further aspect of the present invention provides for a sun visor for motor vehicles or the like, comprising: a frame assembly comprising first and second mating frame members; each said first and second frame member having an open side; said first and second mating frame members connected at their open side ends by hinge means; said first and second mating frame members further comprising an inner recessed flange and an outer flange; said first frame member having a plurality of male frame locking means spaced along said inner recessed flange, said second frame member having a plurality of female frame locking means spaced along said inner recessed flange and positioned to mate with the corresponding plurality of male frame locking means of said first frame member, said first and said second frame members having a longitudinal channel located in said outer flange and having a plurality of cloth covering locking teeth located therein, a living hinge area in a corresponding location in each of said first and said second frame members; a cover assembly comprising; a stiffener board dimensioned to fit into the recessed inner flange area of said first and second frame members using an attaching means, and a cover fabric dimensioned to cover the frame members and liner board and wrap around the edges of said first and second locked frames and attached to said first and second frames by said plurality of cloth covering locking teeth; and said sun visor having a passage along the hinged edge of said sun visor for the installation of a mounting shaft allowing said sun visor to be mounted in a motor vehicle.

According to a yet further aspect of the present invention provides for the production of a sun visor which is both economical to produce and easy to assemble.

According to yet another aspect of the present invention provides for a very thin sun visor which does not require costly manufacturing retooling.

BRIEF DESCRIPTION OF DRAWINGS

FIG. 4 is a sectional plan view through section line B—B FIG. 3 of one embodiment of the sun visor of the present invention in a closed position without the cloth covering.

FIG. 6 is a sectional plan view through section line B—B FIG. 3 of one embodiment of the sun visor of the present invention in a closed position with the cloth covering installed.

DETAILED DESCRIPTION

Figure 1:
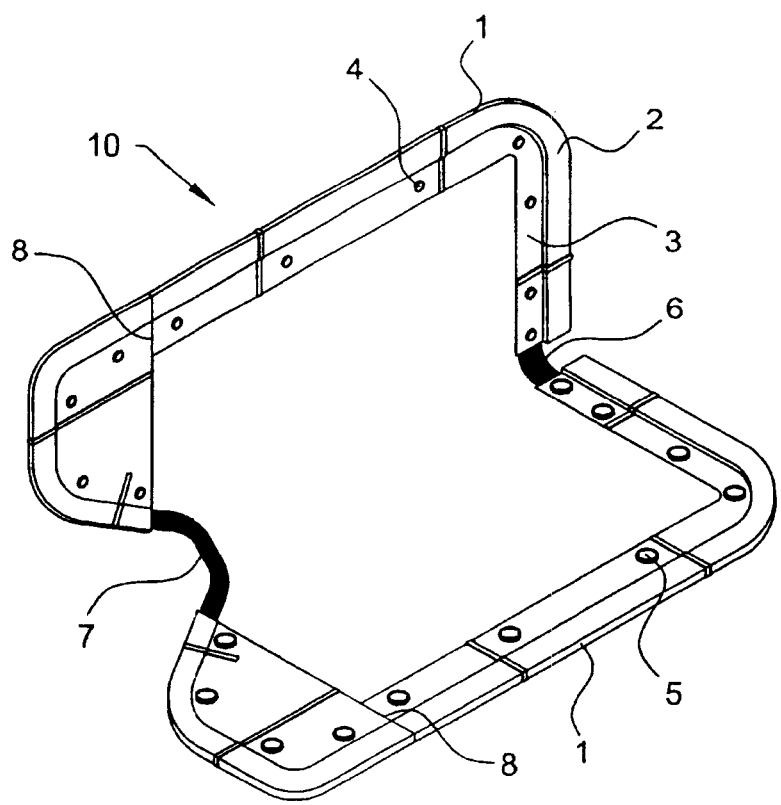
FIG. 1 is an isometric view of a preferred embodiment of the sun visor frame of the present invention.

Reference will now be made to the drawings, wherein to the extent possible like reference numerals are utilized to designate like components throughout the various views. Referring to FIG. 1 which presents a perspective view of a preferred embodiment of a sun visor frame assembly 10 of the present invention comprising a pair of mating frame members 1, each frame member 1 having an open side. Said open side of frame members 1 are connected by living hinge means 6 and 7. One of each of said mating frame members 1 has a plurality of male frame locking means 4 and the corresponding mating frame member 1 has a plurality of corresponding female frame locking means 5 located along the frame recessed inner flange 3 of frame members 1. The outer frame flanges 2 have located thereon a plurality of cloth covering locking teeth 11 (FIGS. 4–10). Additionally, shown in FIG. 1 is a living hinge means 8 for a visor ear in each corresponding mating frame member 1. The hinge means 6 and 7 are comprised of a flexible material which allows for easy and accurate alignment of the mating frame members 1 without undo bulk. Preferably the hinge means 6 and 7 comprises a thin section of the same material the rest of the sun visor frame assembly 10. The mating frame members 1 may comprise any suitable material known in the sun visor art, preferably polypropylene. The hinge means 6 and 7 are preferably molded as an integral portion of the sun visor frame assembly 10.

Figure 2:
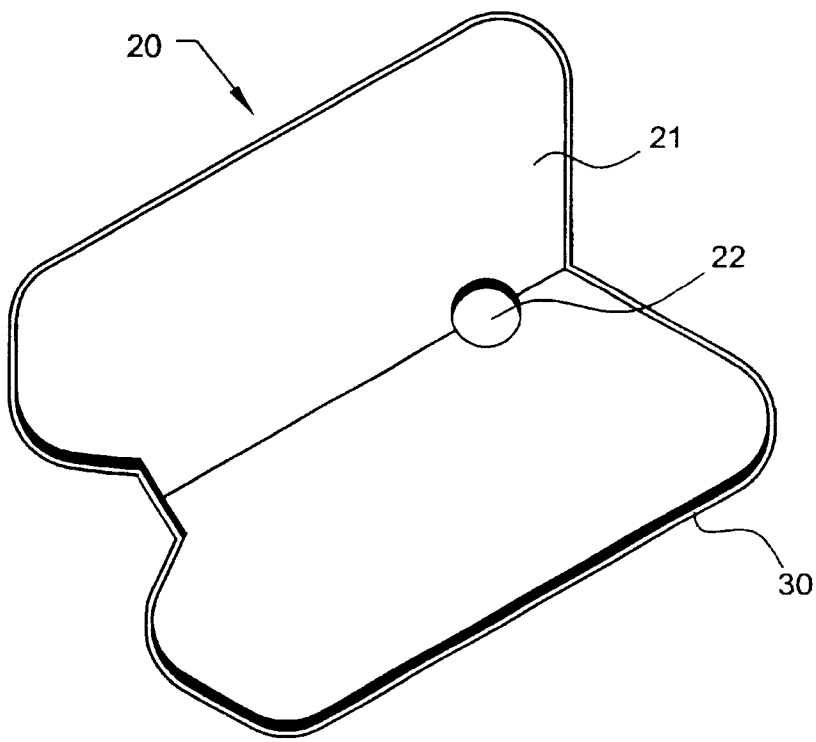
FIG. 2 is an isometric view of a preferred embodiment of the sun visor cover assembly of the present invention

Referring now to FIG. 2 there is presented a perspective view of a preferred embodiment of a cover assembly 20 having a stiffener board 21 and a cloth foam outer covering 30 which becomes the exposed surfaces of the sun visor and which preferably matches or coordinates with the rest of the automobile interior. The stiffener board 21 may be comprised of any suitable material well known in the art. Preferably the stiffener board 21 comprises 60 point veldor board. Also shown in FIG. 2 is an opening 22 which may accommodate a rod (not shown) for use in attaching the free end of the sun visor to the automobile.

Figure 3:
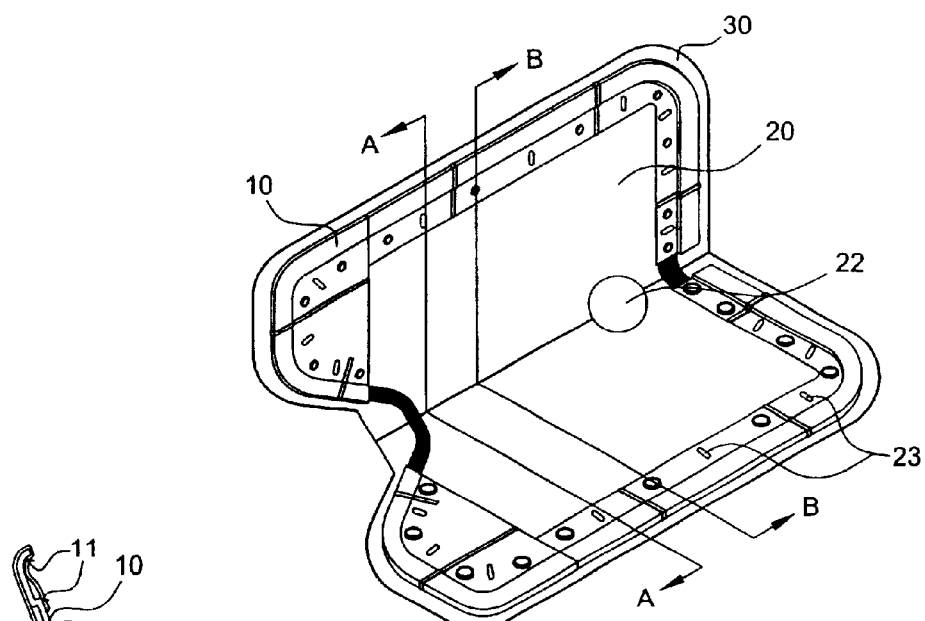
FIG. 3 is an isometric view of a preferred embodiment of the sun visor frame with the sun visor cover assembly installed therein.

Turning now to FIG. 3 there is shown a perspective view of the cover assembly 20 mounted on the inner flange of sun visor frame assembly 10 by a plurality of staples 23. While staples 23 are the presently preferred means of attaching the cover assembly 20 to the sun visor frame assembly 10 however it will be appreciated by those skilled in the art that other known means of attachment may be used and are within the scope of the present invention.

Referring to FIG. 4 there is shown a sectional plan end view showing the frame assembly 10, hinge means 6, and stiffener board 21 attached to said frame assembly 10. Frame assembly 10 further shows male frame locking means 4 locked within female frame locking means 5 and covering locking teeth 11.

Now referring to FIG. 6 shows a sectional plan end view showing the frame assembly 10, hinge means 6, stiffener board 21, and cover fabric 30 attached to said frame assembly 10. Frame assembly 10 further shows male frame locking means 4 locked within female frame locking means 5 and covering locking teeth 11 locking the edges of cover fabric 30 to the frame assembly 10.

Figure 5:
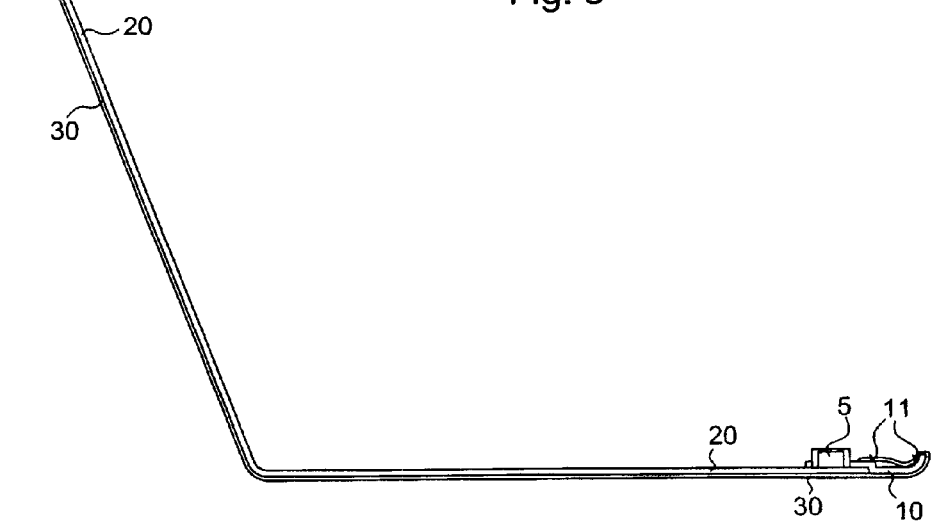
FIG. 5 is a sectional plan view through section line B—B FIG. 3 of one embodiment of the sun visor of the present invention in an open position with the cloth covering installed.

Turning to FIG. 5 there is shown a sectional plan end view showing the frame assembly 10 in an open position, the frame members connected by hinge means 6 and cover fabric 30 locked into position along the edge of said frame assembly by covering locking teeth 11. Also shown are male frame locking means 4 and female frame locking means 5.

Figure 7:
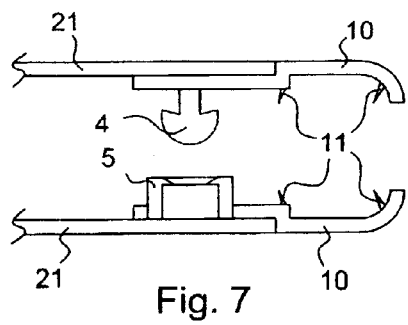
FIG. 7 is a partial sectional plan view through section line B—B FIG. 3 of one embodiment of the present invention showing the frame locking means and cloth covering locking means in an unlocked position without the cloth covering installed.

Referring to FIG. 7 there is shown a partial sectional plan end view of the sun visor assembly of the present invention without the cover fabric 30 comprising the frame assembly 10, stiffener board 21 mounted thereto, cover fabric locking teeth 11, and male frame locking means 4 and female frame locking means 5 in an open or unlocked position.

Figure 8:
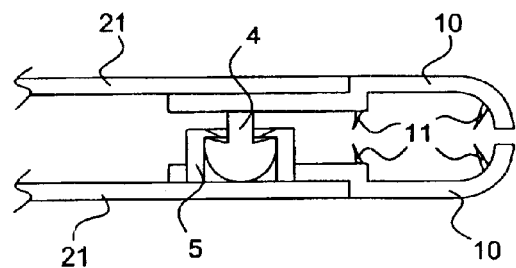
FIG. 8 is a partial sectional plan view through section line B—B FIG. 3 of one embodiment of the present invention showing the frame locking means and cloth covering locking means in a locked position without the cloth covering installed.

Now referring to FIG. 8 there is shown a partial sectional plan end view of the sun visor assembly of the present invention comprising the frame assembly 10, and the stiffener board 21 without cover fabric 30 mounted thereto, cover fabric locking teeth 11, and male frame locking means 4 and female frame locking means 5 in closed or locked position.

Figure 9:
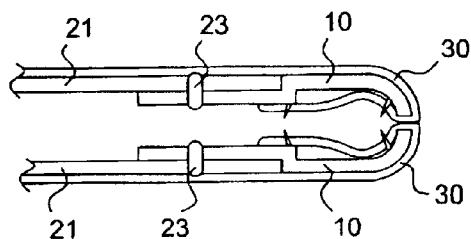
FIG. 9 is a partial sectional plan view through section line A—A FIG. 3 of one embodiment of the present invention showing the frame locking means and cloth covering locking means in an unlocked position with the cloth covering installed.

In addition, referring to FIG. 9 there is shown a partial sectional plan end view of the sun visor assembly of the present invention comprising the frame assembly 10, and the stiffener board 21 fixedly attached to frame assembly 10 by attaching means 23. The presently preferred attaching means 23 is staples. Also shown is cover fabric 30 locked into the frame by locking teeth 11 in a closed or locked position.

Figure 10:
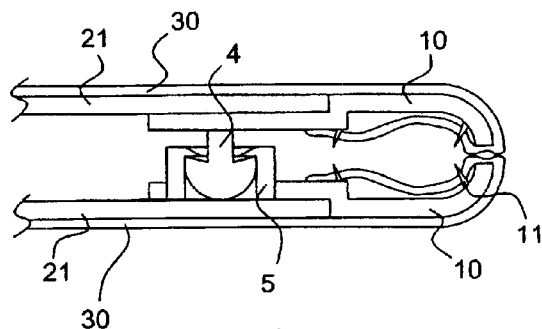
FIG. 10 is a partial sectional plan view through section line B—B FIG. 3 of one embodiment of the present invention showing the frame locking means and cloth covering locking means in a locked position with the cloth covering installed.

Finally, referring to FIG. 10 there is shown a partial sectional plan end view of the sun visor assembly of the present invention comprising the frame assembly 10, and stiffener board 21 fixedly attached to frame assembly 10 with cover fabric 30 edges fixedly attached to frame assembly 10 by attaching means locking teeth 11. Also shown are male locking means 4 locked within female locking means 5 in a closed or locked position.

It is to be understood that the sun visor of the present invention mounts on a bent shaft by having the bent shaft pass through the sun visor at the hinged edge as is well known in the art.

From the forgoing it will be appreciated by those skilled in the art that a sun visor of very thin edge radius may be advantageously provided. Further, this very thin edge radius sun visor is economical to produce, easy to assemble, and utilizes materials common to the sun visor art.

Although the preferred embodiments of the present invention has been disclosed, various changes and modifications may be made without departing from the scope of the invention as set forth in the appended claims.

What is claimed is:

1. A sun visor for motor vehicles, comprising:
   a frame assembly comprising first and second mating frame members;
   a) each said first and second frame member having an open side;
   b) said first and second mating frame members connected at their open side ends by hinge means;
   c) said first and second mating frame members further comprising an inner recessed flange and an outer flange;
      i) said first frame member having a plurality of male frame locking means spaced along said inner recessed flange,
      ii) said second frame member having a plurality of female frame locking means spaced along said inner recessed flange and positioned to mate with the corresponding plurality of male frame locking means of said first frame member,
      iii) said first and said second frame members having a longitudinal channel located in said outer flange and having a plurality of cloth covering locking teeth located therein;
   a cover assembly comprising;
   a) a liner board dimensioned to fit into the recessed inner flange area of said first and second frame members using an attaching means, and
   b) a cover fabric dimensioned to cover the frame members and liner board and wrap around the edges of said first and second locked frames and attached to said first and second frames by said plurality of cloth covering locking teeth; and
   said sun visor having a passage along the hinged edge of said sun visor for the installation of a mounting shaft allowing said sun visor to be mounted in a motor vehicle.

2. The sun visor as claimed in claim 1 wherein, said first and said second frame members are composed of plastic.

3. The sun visor as claimed in claim 1 wherein, said cover assembly has an opening exposing the sun visor mounting shaft allowing said mounting shaft to latch to the motor vehicle.

4. The sun visor as claimed in claim 1 wherein, said cloth covering is permanently bonded to said liner board.

5. The sun visor as claimed in claim 2 wherein, said plastic is polypropylene.

6. The sun visor as claimed in claim 1 wherein, said frame members and said living hinge means are molded as a single unit.

7. The sun visor as claimed in claim 1 wherein, said covering cloth is foam cloth.

8. The sun visor as claimed in claim 1 wherein, said hinge means comprises an integral living hinge means molded as an integral part of the sun visor frame members.

9. The sun visor as claimed in claim 1 wherein, said attaching means for attaching said liner to said frame members is stapling.

10. The sun visor as claimed in claim 1 wherein, said liner board is composed of 60 point veldor board.

11. A sun visor for motor vehicles, comprising:
    a frame assembly comprising first and second mating frame members;
    a) each said first and second frame member having an open side;
    b) said first and second mating frame members connected at their open side ends by hinge means;
    c) said first and second mating frame members further comprising an inner recessed flange and an outer flange;
       i) said first frame member having a plurality of male frame locking means spaced along said inner recessed flange,
       ii) said second frame member having a plurality of female frame locking means spaced along said inner recessed flange and positioned to mate with the corresponding plurality of male frame locking means of said first frame member,
       iii) said first and said second frame members having a longitudinal channel located in said outer flange and having a plurality of cloth covering locking teeth located therein,
       iv) a living hinge area in a corresponding location in each of said first and said second frame members;
    a cover assembly comprising;
    a) a stiffener board dimensioned to fit into the recessed inner flange area of said first and second frame members using an attaching means, and
    b) a cover fabric dimensioned to cover the frame members and liner board and wrap around the edges of said first and second locked frames and attached to said first and second frames by said plurality of cloth covering locking teeth; and
    said sun visor having a passage along the hinged edge of said sun visor for the installation of a mounting shaft allowing said sun visor to be mounted in a motor vehicle.

12. The sun visor as claimed in claim 11 wherein, said first and said second frame members are composed of plastic.

13. The sun visor as claimed in claim 11 wherein, said cover assembly has an opening exposing the sun visor mounting shaft allowing said mounting shaft to latch to the motor vehicle.

14. The sun visor as claimed in claim 11 wherein, said cloth covering is permanently bonded to said stiffener board.

15. The sun visor as claimed in claim 12 wherein, said plastic is polypropylene.

16. The sun visor as claimed in claim 11 wherein, said frame members and said living hinge means are molded as a single unit.

17. The sun visor as claimed in claim 11 wherein, said covering cloth is foam cloth.

18. The sun visor as claimed in claim 11 wherein, said hinge means comprises an integral living hinge means molded as an integral part of the sun visor frame members.

19. The sun visor as claimed in claim 11 wherein, said attaching means for attaching said stiffener-board to said frame members is stapling.

20. The sun visor as claimed in claim 11 wherein, said stiffener board is composed of 60 point veldor board.

* * * * *